United States Patent Office.

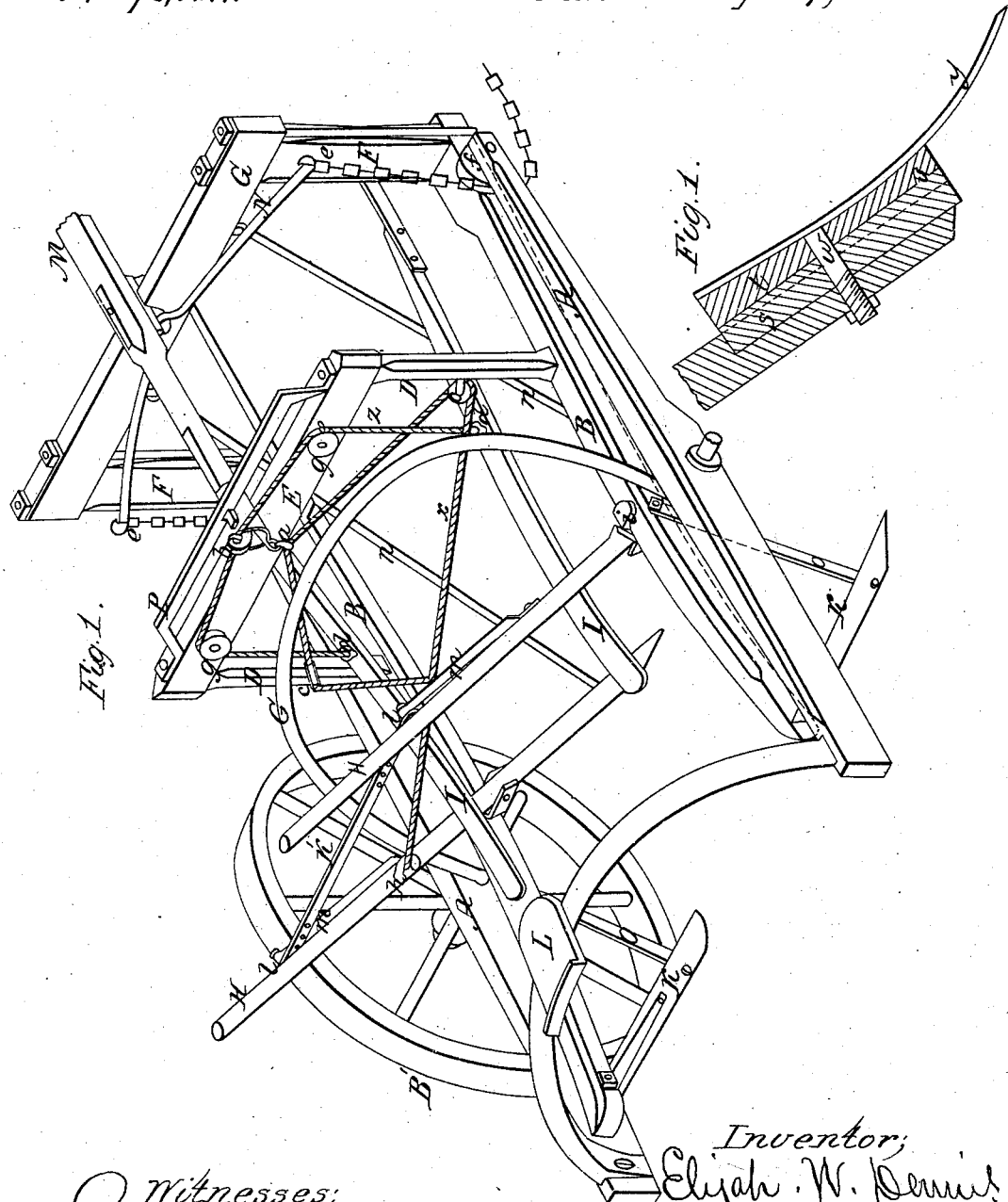

ELIJAH W. DENNIS, OF PEORIA, ILLINOIS.

Letters Patent No. 76,411, dated April 7, 1868; antedated March 25, 1868.

IMPROVEMENT IN CULTIVATORS.

The Schedule referred to in these Letters Patent and making part of the same.

TO ALL WHOM IT MAY CONCERN:

Be it known that I, ELIJAH W. DENNIS, of Peoria, in the county of Peoria, and State of Illinois, have invented certain new and useful Improvements in Cultivators; and I do hereby declare that the following is a full, clear, and exact description of the same, reference being had to the accompanying drawings, and to the letters of reference marked thereon.

In the annexed drawings, making part of this specification, A represents a frame, which is supported about its centre by an axle, C, which said axle is supported upon the wheels B'. The axle C, after leaving the frame, is curved in the manner represented in the drawings. This frame or body A carries another frame, B B, which is narrower than said frame A, so as to lie within it. The frame B is pivoted, near its forward end, to the forward end of frame A, and works freely upon its pivot. On the pins which form the pivot, and between the two frames, are grooved pulleys, and around these pulleys the chains $e\ e$ pass, being draught-chains. Upon the frame B are erected four uprights, F F and D D, which carry the cross-pieces G and E at their upper ends.

Secured upon the outside of and near the rear end of the frame B are two beams K K, which are provided with braces $o\ o$, and which are intended to carry shovel or cultivator-teeth on their lower ends. H H represent two handles, which consist of bars pivoted in jaws on the inside of the frame B, a little in rear of its centre, and which are also provided on their lower ends with shovels or cultivator-teeth. The handles H H are connected near their upper ends by means of a bar, $k'$, which is provided, near its ends, with holes, for the purpose of bringing together or separating the said handles.

A cord, $x$, having one end secured to one of the handles, crosses the frame B to one of the standards D, passes around a pulley, C, upon said upright, then passes up and ties to a loop on the end of pole M, then passes to a pulley on the other upright or standard D, and thence crosses over and secures to the other handle H of the cultivator. The object of this cord is to move the rear end of the pole, by means of the handles, for the purpose of giving direction to the machine.

I I represent two treadle-levers, which have their forward ends connected to the uprights F F by means of flat metallic springs, and which run back toward the rear of the machine, passing between the levers I I. A cord, $z$, having one end attached to one of these levers, passes up to a loop in the end of a spring on the rear end of pole M, and, being there tied, the other end passes down, and is secured to the other lever I. This cord passes over two pulleys $g\ g$ upon the cross-piece E. The object of this cord $z$ is that direction may be given to the machine by means of the levers I I, when desired, by operating the rear end of the pole, or drawing down a spring, $h$, which catches into a bar, P, allowing the rear end of the pole to move toward one side or the other.

L represents the driver's seat, which is secured upon the centre of a curved cross-bar, which connects the rear end of the frame-pieces of frame A. When the driver sits upon this seat, his feet rest upon the levers I I, and he takes hold of the handles H H with his hands. By means of the levers and handles, he is enabled to give direction to the machine, to bring the teeth on the lower end of the handles closer together, or separate them, or to raise the frame B for throwing the teeth out of the ground, or to regulate their depth. By pushing the handles forward, the operator is enabled to throw the frame B up, and thus elevate the teeth attached to its parts out of the ground.

The shovels or teeth are attached to the beams and levers as follows: A metallic wedge-shaped plate, $s$, is provided with a nipple, $v$, formed upon it, then a plate, $t$, also of metal, with one side flat, and the other made concave, with a series of holes made near its ends, into which the nipple $v$ passes. I take the plate $s$, and place it against the beam or handle at its lower end; then place against this plate the flat side of plate $t$, then place against the concave side of plate $t$ the tooth $y$, then pass a bolt, $w$, through the tooth and both plates, and secure it by a nut. By means of the holes in plate $t$ and the nipple on plate $s$, I am enabled to adjust the said plate $t$ as circumstances may require. As one end of plate $t$ is made thicker than the other, it will be seen that by reversing the ends of it the tooth may be given a different set.

The chains $e\ e$ are secured to the ends of a bar, N, which said bar is hung at its centre to the under side of the pole, just in rear, of cross-piece G. The forward ends of chains $e\ e$ pass forward to the forward end of the pole M' and act as draught-chains for the machine.

$n\ n$ are braces for the lower ends of the handles H H, and are secured at their forward ends to the under side of cross-bar G G.

Having thus fully described my invention, what I claim as new, and desire to secure by Letters Patent, is—

1. The arrangement of the levers I I and cord $z$ with spring $h$ on the pole M, substantially as and for the purpose specified.

2. The arrangement of the levers, handles H H with the cord $x$ and the pole M, substantially as and for the purpose specified.

3. The arrangement of the plates $s$ and $t$, as constructed, with the shovel $y$ and bolt $w$, for securing the shovel to the beam, substantially as and for the purpose set forth.

As evidence that I claim the foregoing, I have hereunto set my hand in the presence of two witnesses.

ELIJAH W. DENNIS.

Witnesses:
JOHN C. YATES,
JAS. M. CUNNINGHAM.